(12) United States Patent
Kesarwani

(10) Patent No.: US 10,235,372 B1
(45) Date of Patent: Mar. 19, 2019

(54) LOG MESSAGE STORAGE

(71) Applicant: Amazon Technologies, Inc., Seattle, WA (US)

(72) Inventor: Nitin Kesarwani, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 15/047,614

(22) Filed: Feb. 18, 2016

(51) Int. Cl.
*G06F 17/00* (2006.01)
*G06F 17/30* (2006.01)
*G06F 17/27* (2006.01)

(52) U.S. Cl.
CPC .... *G06F 17/30097* (2013.01); *G06F 17/2705* (2013.01); *G06F 17/30106* (2013.01)

(58) Field of Classification Search
CPC .. G06F 9/546; G06F 11/1471; G06F 11/3476; G06F 17/2785; G06F 17/30864
See application file for complete search history.

(56) References Cited

U.S. PATENT DOCUMENTS

2016/0124823 A1* 5/2016 Ruan ................... G06F 11/2257 714/26

* cited by examiner

*Primary Examiner* — Truong V Vo

(74) *Attorney, Agent, or Firm* — Thorpe North & Wester, LLP

(57) ABSTRACT

A technology is described for processing a log message. An example method may include identifying a log template in a log statement associated with a computer program. Extracting the log template from the log statement and creating a log template file that includes a template identifier referencing the log template. The computer program and the log template file may be deployed to a server that hosts the computer program, and a log message output by the computer program executing on the server may include the template identifier and a log data value that is stored to a log data store.

20 Claims, 12 Drawing Sheets

LOG MESSAGE STORAGE

BACKGROUND

Many operating systems, software frameworks, distributed applications, metric trackers, and programs include a logging system configured to record execution related events. Log messages may record events taking place in the execution of a system or application and may provide an audit trail that can be used to understand the activity of a system and diagnose problems. Log messages may also be used to understand the activities of complex systems, particularly in the case of applications with little user interaction, such as server-based applications.

Log messages may be created by inserting log statements into computer code. During execution of the computer code, the log statements included in the computer code and log data generated by the computer code may be output to a logging system that processes the log messages. The log messages may provide information related to particular executions of the computer code. Moreover, the log messages can be saved to a persistent medium so that the log messages can be analyzed at a later time.

DETAILED DESCRIPTION

Figure 1A:
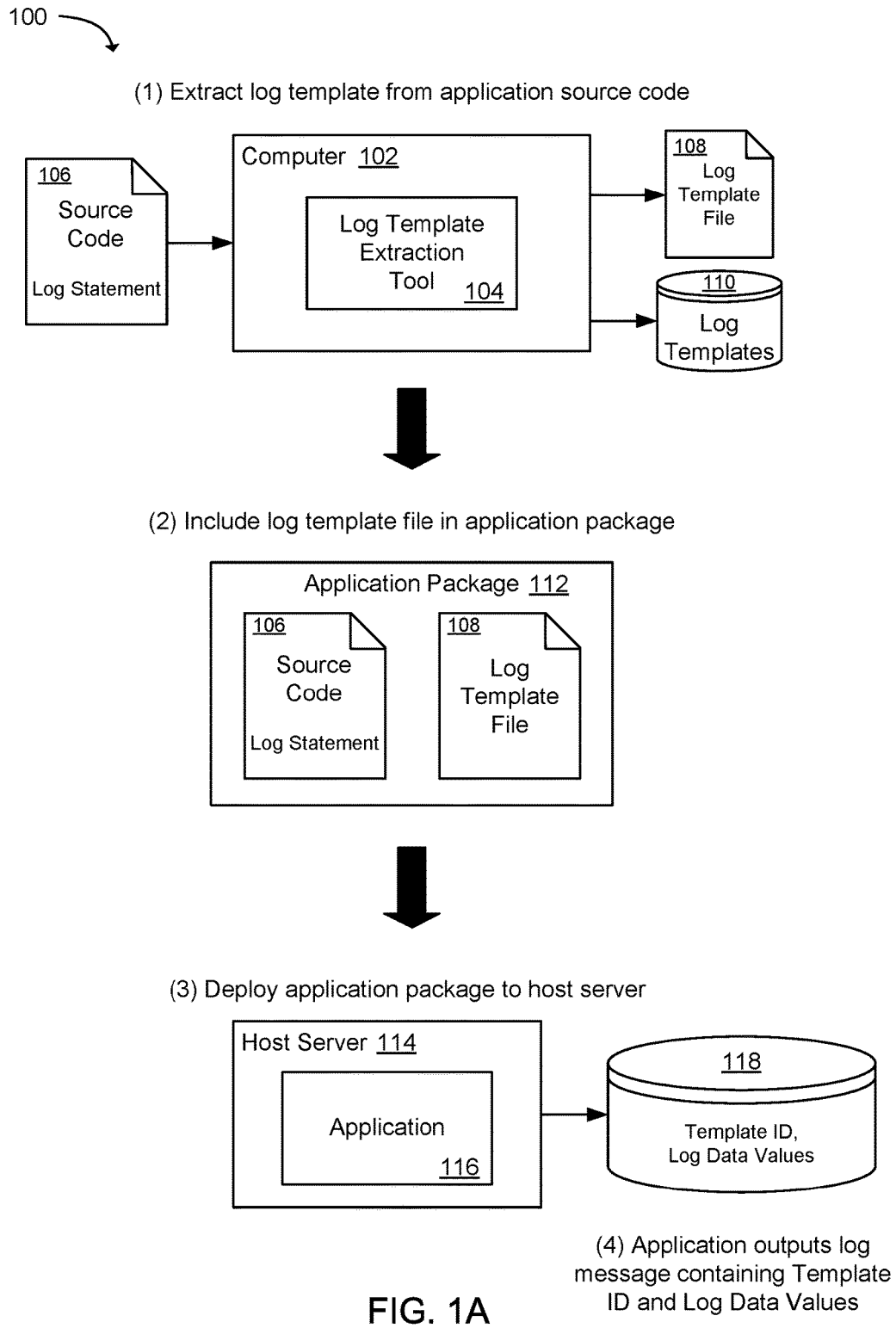
FIG. 1A is a block diagram that illustrates an example system and method for extracting log templates from application source code to create a log template file that is included in an application package.

A technology is described for processing log messages output by a computer program for storage. In one example, source code for a computer program (e.g., application, script, network service, and the like) may be parsed to identify log statements embedded in the source code. When executed, a log statement may generate a log message. For example, when executed, the log statement system.out.printlog ("System Error") generates the log message "System Error". A log statement may include a log template that includes template value placeholders for log data values. The log statement may generate a log message that includes the log data values. For example, a log template may include a statement (e.g., "Error in opening the file [filename]") that provides context for a log data value (e.g., a file name) included with the statement. For example, the log message "Error in opening the file foo.txt" output by a logging system may contain both the log template "Error in opening the file" and the log data value "foo.txt".

A log template identified in a log statement from the source code of the computer program may be used to generate a template identifier for the log template. For example, a log template may be input to a hash function that generates a hash value used as a template identifier for the log template. Log templates and the template identifiers may be packaged with a computer program executable and used by a logging utility to process log messages for storage. For example, the logging utility may identify the log template in a log message output by the executing computer program and store the template identifier associated with the log template instead of storing the contents of the log template (i.e., the template identifier may be stored in the place of the log template in a log message record). The template identifier may be stored with any log data values included in the log message.

In another example, text of a log message output by a computer program may be analyzed to identify components of a log template used to construct the log message and to identify log data values included in the log message. After identifying a log template and log data values in a log message, the log template and the log data values may be extracted from the log message. The log data values and the log template may then be stored separately. For example, log data values may be stored in a log data store with a template identifier that references a log template, and the log template referenced by the template identifier may be stored separately in a template data store. The template identifier may be generated to uniquely represent the log template. In one example, a template identifier may be generated using a hash function. For example, log template components may be input to a hash function that generates a hash value and the hash value may be used as the template identifier.

A stored log message may be reconstructed by retrieving log data values and a template identifier for the log message from the log data store. The template identifier may be used to retrieve a log template for the log message from the template data store. The log data values may be incorporated into the log template and the reconstructed log message may be returned in response to a request for the log message (e.g., a request to view or use the log message).

In the past, storing log messages that have identical log formats for log messages has resulted in occupying additional storage space due to the repetitive nature of the log templates included in the log messages. For example, although log data values included in the log messages may vary between the log messages, many of the log messages may include the same log template. This may occur because a statement included in computer code may be output multiple times with different log data values during execution of the computer code. Therefore, storing the log messages has resulted in storing duplicate information that has unnecessarily occupied storage space. While storing one or two duplicates may not incur a significant amount of storage costs, storing millions or billions of duplicated messages can incur significant costs. The current technology results in reducing the size of a log message stored to a storage location by removing a log template from the log message and replacing the log template with a template identifier that identifies the log template stored in a separate location. Because the size of the log message is reduced, a smaller amount of storage space may be needed to store the log message.

FIG. 1A is a block diagram that illustrates a high level example of a system 100 and method for identifying log statements in application source code 106 and creating a log template file 108 that is included in an application package 112 that may be deployed to a host server 114 that hosts the application 116 included in the application package 112. A logging utility executed in association with the application 116 may use the log template file 108 to identify a log template in a log message output by the application 116 and replace the log template with a template identifier, such that the template identifier and log data values are stored to a log data store 118, thereby decreasing an amount of storage needed to store a log message.

As illustrated, a computer 102 may execute a log template extraction tool 104 configured to parse application source code 106 for log statements that when executed, output log messages. The log template extraction tool 104 may be configured to identify a log statement and extract a log template comprising a regular expression (e.g., "Could not open file % because the % service timed out in % seconds") that includes one or more template value placeholders (e.g., "%"). After extracting a log template from the application source code 106, a template identifier for the log template may be generated. For example, a log template may be input to a hash function that outputs a hash value used as a template identifier. A log template and a template identifier for the log template may be stored to a log template data store 110. As such, a single instance of a log template may be stored and may be referenced using a template identifier for the log template. For example, when retrieving a log message from storage, the log message may be reconstructed by obtaining log data values for replacing the template value placeholders in the log template and a template identifier from the log data store 118 and obtaining the log template from the log template data store 110 using the template identifier and inserting the log data values into the log template.

In addition to storing the log template and the template identifier to the log template data store 110, the log template extraction tool 104 may be configured to create a log template file 108 included in an application package 112. The log template file 108 may include a log template and a template identifier for the log template and the log template file 108 may be used to identify a log template in a log message output by the application 116 and replace the log template with the template identifier for the log template.

As a specific example, the function:
public int addNumbers(int number1, int number2) {
 int sum=number1+number2;
 log.info("The sum of number1={ } and number2={ } is { }.", number1, number2, sum);
 return sum;
}
includes the log output statement "log.info("The sum of number1={ } and number2={ } is { }.", number1, number2, sum)". In the case that the variables included in the log message have the values "number1=1", "number2=2", and "sum=3"; the log message output by the log output statement may be: "The sum of number1=1 and number2=2 is 3". A template identifier may be generated for the log template "The sum of number1={ } and number2={ } is { }." and the template record "TemplateId=5a6f4147, LogTemplate="The sum of number1={ } and number2={ } is number3=0"" may be stored to the log template data store 110 for use in reconstructing a stored log message. The template identifier may then be used to replace the log template in a log message previously output by the function and the template identifier and log data values may be stored to the log data store 118. A log message that is output by the function and is then transformed may resemble "TemplateId=5a6f4147, 1, 3, 3", thus a log message record stored to the log data store 118 may occupy a smaller amount of storage in the log data store 118 as compared to a log message record that includes the log template.

Figure 1B:
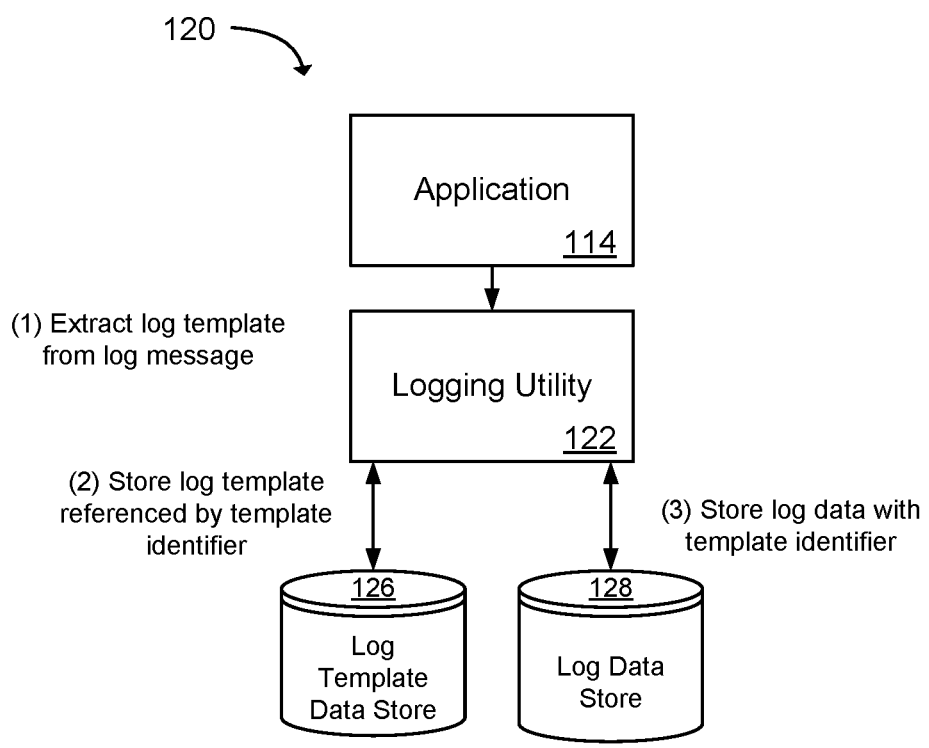
FIG. 1B is a block diagram illustrating an example system and method for storing log message output by an application.

FIG. 1B is a block diagram illustrating an alternative high level example of a system 120 and method for storing a log message output by an application 124. As illustrated, the system 120 may include a logging utility 122 configured to process log output generated by an application 124 (e.g., a computer program or computing service). The application 124 may contain log statements (e.g., output statements or Application Programming Interface (API) calls to the logging utility 122) in the application's program code (i.e., executable code or interpretable code) that when executed output log messages to the logging utility 122. The system 120 may also include a log template data store 126 and a log data store 128.

The logging utility 122 may receive log output from the application 124. The log output may include a log template and log data values. In one example, the log template may include syntactic components and log data values that together form the log template. As an illustration, a log template may comprise "Could not open file % because the % service timed out in % seconds". The template value placeholders ("%" or a variable name) in the log template may be populated with log data values when the log message is output to a file, data storage, or a display.

The logging utility 122 may be configured to analyze a log message to identify a log template and log data values in the log message. In one example, a log message output by an application 124 may be formatted as a delimiter separated string containing a log template (having template value placeholders) and log data values. For example, a log message may comprise a comma separated string containing a log template followed by one or more comma separated log data values. As an illustration, the comma separated string of a log message may comprise "Could not open file % because the % service timed out in % seconds", "foo.txt", "data_production", "5". A log message string may be parsed to identify the delimiters in the log message and the log template may be identified based on a location of the log template in the string. For example, a log message may be formatted to include a delimited log template in a first position of the log message string followed by one or more delimited log data values.

In another example, a log message output by an application 124 may be formatted as a non-delimited string. For example, the log message may comprise a statement with integrated log data values. As an illustration, the log message may comprise "Could not open file foo.txt because the data_production service timed out in 5 seconds". The log message may be parsed into logical syntactic components to separate the log template from the log data values. As an illustration, the syntactic components "Could not open file", "because the", "service timed out in", and "seconds" may be identified, and the log data values "foo.txt", "data_production", and "5" may be identified. As one illustration, parsing a log message in order to separate a log template from log data values may be performed by comparing similar log messages. For example, log messages may be compared to detect similarities in syntactic components that comprise a log template and detect log data values by identifying differences in the log data values between the log messages.

After analyzing a log message to identify a log template and log data values, the log template may be extracted from the log message. A template identifier may be generated for the log template. In one example, a hash function may be used to generate a hash value that represents the log template. Example hash functions may include non-cryptographic hash functions (e.g., Fowler-Noll-Vo (FNV), SDBM, and SuperFastHash) and cryptographic hash functions (e.g., MD5 and SHA-1). As one example, a log template (e.g., template components) may be input to a hash function that generates a hash value using the log template. As an illustration, the log template "Error–variable % contains a null value" may be input to a hash function and the resulting hash value may be used as a unique template identifier. As another example, a string of ordered template components comprising a log template may be input into a hash function to generate the template identifier. As an illustration, the template components "Error–variable", and "contains a null value" may be logically ordered and input to a hash function to produce a hash value that may be used as a template identifier.

After extracting a log template from a log message and generating a template identifier for the log template, the log template data store 126 may be queried to determine whether the log template exists in the log template data store 126. The log template data store 126 may be configured to store log templates referenced by template identifiers as a database lookup value or key value, such that there is a one-to-one relationship between a log template and a template identifier. In one example, the log template data store 126 may store a single instance of a log template referenced by a template identifier, thereby utilizing a smaller amount of storage space as compared to storing log messages that include repetitive log templates.

A template identifier that uniquely identifies a log template may be used to determine whether a log template exists in the log template data store 126. For example, after extracting a log template from a log message and generating a template identifier, the log template data store 126 may be queried using the template identifier to determine whether the log template data store 126 contains the log template. In the event that the log template data store 126 does not contain the log template (i.e., the template identifier), the log template may be added to the log template data store 126, such that the template identifier references the log template in the log template data store 126. In the event that a log template already exists in the log template data store 126, the log template may not be added to the log template data store 126.

Log value data for a log message may be stored in the log data store 128 with a template identifier associated with a log template for the log message. More specifically, a log message record that contains the template identifier and the log data values may be stored in the log data store 128. As such, the template identifier may take the place of the log template in the log data store 128 and may be used to identify the log template stored in the log template data store 126. Illustratively, a non-limiting example of a record format for storing a template identifier and log data values in the log data store 128 may look like ("template_ID, "log_data", "log_date", "log_data"). In retrieving a log message record from the log data store 128, a template identifier may be obtained from the log message record and the template identifier may be used to retrieve a log template associated with the log data values from the log template data store 126 as described below.

Figure 2:
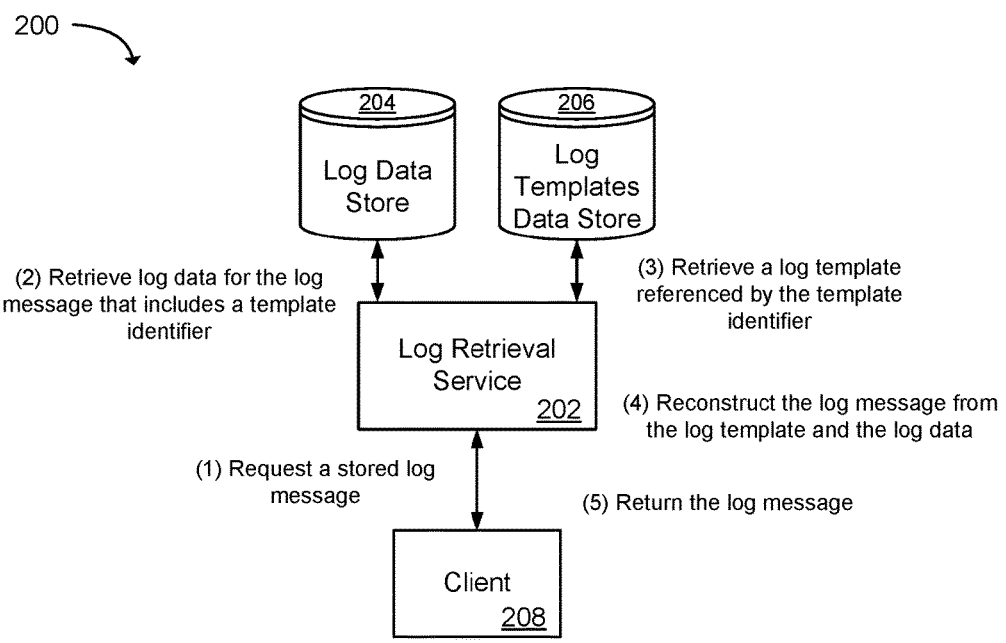
FIG. 2 is a block diagram that illustrates an example system and method for retrieving stored log messages using a log retrieval service.

FIG. 2 is a diagram that illustrates a high level example of a system 200 and method for retrieving stored log messages using a log retrieval service 202. The system 200 may include the log retrieval service 202, a log data store 204, and a log template data store 206. In some configurations, the log retrieval service 202 may be part of the logging utility 122 (FIG. 1) The log data store 204 may store log messages that comprise log data values and template identifiers. More specifically, a log message stored in the log data store 204 may comprise log data values and a template identifier that references a log template stored in the log template data store 206.

The log retrieval service 202 may be configured to identify a log message record stored in the log data store 204 and a template record stored in the log template data store 206 and reconstruct a log message from the log message record and the template record in response to a request from a client 208. A client 208 may be a client device used to make requests for log messages to the log retrieval service 202 via a network using an API or other method, or a client 208 may be an application or computer service configured to obtain log messages from the log retrieval service 202 for reporting purposes.

In response to a request for a log message, the log retrieval service 202 may be configured to query the log data store 204 for a log message record that corresponds to the log message request. Illustratively, a log message may be retrieved using a search parameter, such as a time stamp, system or application identifier, error code, or other search parameters. After retrieving the log message record, a template identifier obtained from the log message record may be used to query the log template data store 206 for a template record referenced by the template identifier. The requested log message may then be reconstructed by placing log data values obtained from the log message record into template value placeholders included in the log template, and the reconstructed log message may be returned to the client 208.

As a specific example, a log message record retrieved from the log data store 204 may include the template identifier "A1575" and the log data values "foo.txt", "data_production", and "5". The log template "Could not open file % because the % service timed out in % seconds" may be obtained from the template data store 206 using the template identifier "A1575" that references the log template. The log data values may be populated into the text of the log template resulting in the reconstructed log message "Could not open file foo.txt because the data_production service timed out in 5 seconds". After the log message has been reconstructed, the log message may be returned to a client 208 (e.g., a client application or device) that requested the log message.

Figure 3:
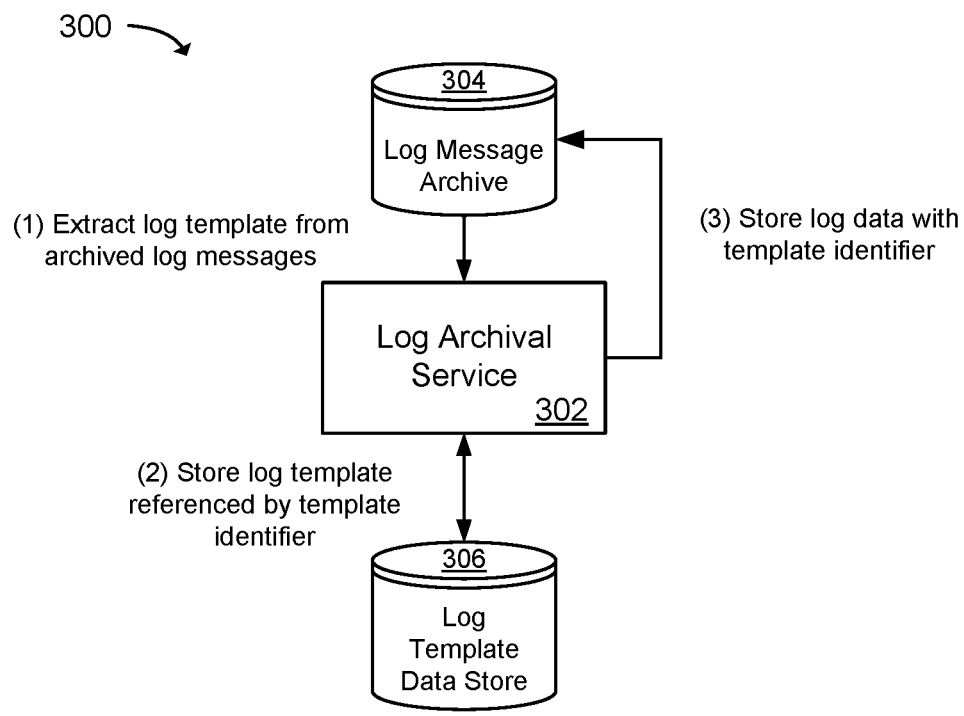
FIG. 3 is a block diagram illustrating an example system and method for extracting log templates from archived log messages.

FIG. 3 is a diagram illustrating a high level example of a system 300 and method for extracting log templates from archived log messages. The system 300 may include a log archival service 302, a log message archive data store 304, and a log template data store 306. Log messages stored in the log message archive data store 304 may include a log template and log data values. The log archival service 302 may be used to extract the log template from the log message and store the log template in the log template data store 306 separately from the log data values using a template identifier to associate the log data values with the log template.

In one example, the system 300 may be used to reduce an amount of storage space occupied in a log message archive data store 304 by extracting log templates from archived log messages and returning the log data values for the log messages with associated template identifiers to the log message archive data store 304. As an example, the log archival service 302 may be configured to retrieve an archived log message from the log message archive data store 304. The log archival service 302 may be configured to analyze the log message to identify a log template and log data values contained in the log message. The log template identified in the log message may be extracted from the log message and a template identifier may be generated for the log template. A determination may then be made whether the template identifier exists in the log template data store 306. In the case that the template identifier does not exist in the log template data store 306, the log template extracted from the log message may be added to the log template data store 306 and the log template may be referenced using the template identifier. More specifically, a template record containing the log template referenced by the template identifier may be stored to the log template data store 306. Log data values contained in the log message and the template identifier for the log template extracted from the log message may be returned to the log message archive data store 304. More specifically, a log message record containing the log data values and the template identifier may be stored to the log message archive data store 304. As a result, the amount of storage space occupied by the log message may be reduced by extracting the log template from the log message and replacing the log template with the template identifier.

In another example, the system 300 may be used to build a log template data store 306 using log templates extracted from archived log messages stored in the log message archive data store 304. The log template data store 306 can then be used by a logging system operating in a production environment that processes log messages output by a computer program by querying the log template data store 306 to determine whether a particular log template exists in the log template data store 306. As an example, the log archival service 302 may be configured to retrieve archived log messages from the log message archive data store 304 and identify and extract log templates from the log messages. Template identifiers may be generated for the log templates extracted from the log messages, and the log templates referenced by the template identifiers may be stored to the log template data store 306.

In one example, the log template data store 306 may be utilized by a logging system associated with a particular computer program. For example, archived log messages associated with a particular computer program may be processed using the log archival service 302 to extract log templates from the log messages, and a log template data store 306 may be constructed using the log templates extracted from the log messages. As a result, the log templates contained in the log template data store 306 may be specific log messages output by the computer program.

In another example, the log template data store 306 may provide a centralized repository of log templates available to logging systems throughout a computing network or computing service. As such, various logging systems operating throughout a computing network or computing service may have access to the log template data store 306 and may utilize the log template data store 306 to process log messages output by computer programs executing within the computing network or computing service.

Figure 4:
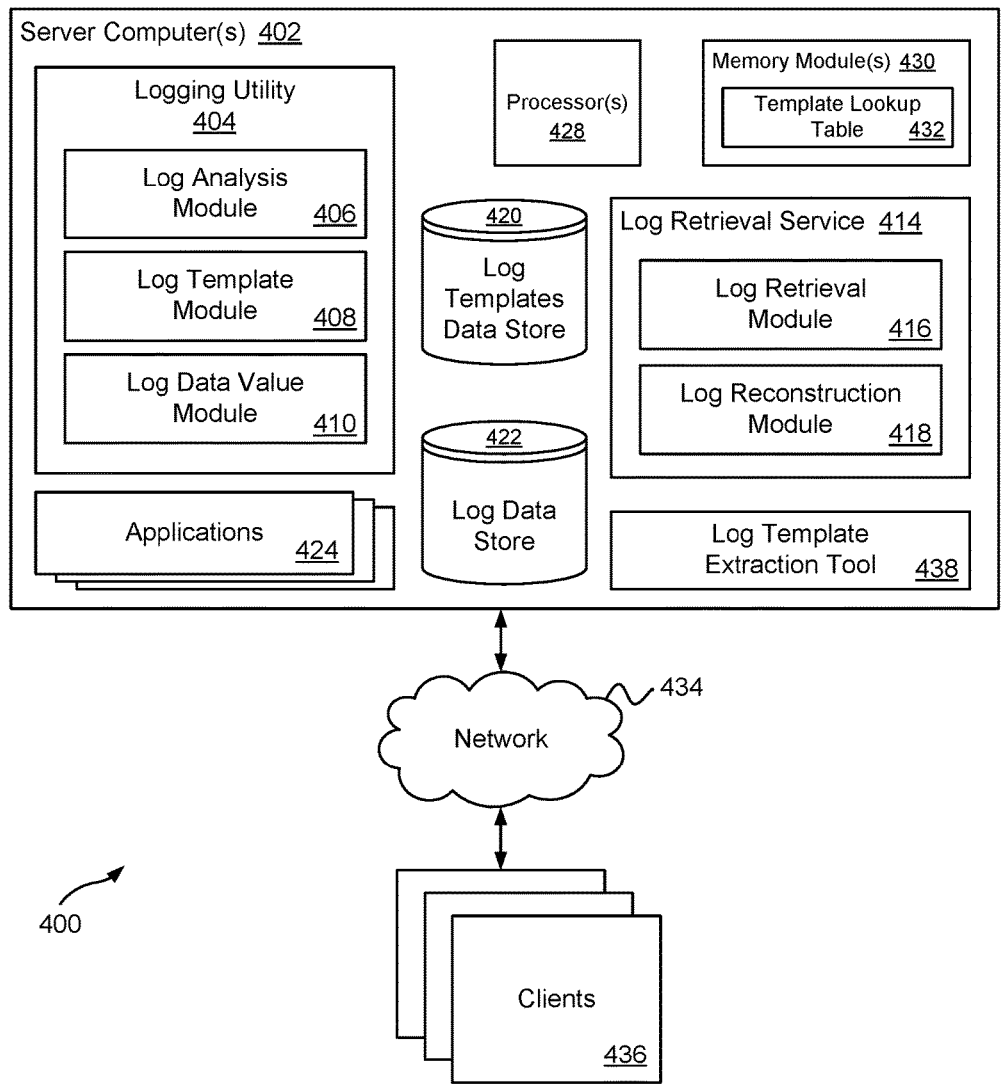
FIG. 4 is a block diagram that illustrates various example components included in a system for processing log messages.

FIG. 4 illustrates components of an example system environment 400 on which the present technology may be executed. The system environment 400 may include a server computer 402 that may be in communication with a plurality of clients 436 via a network 434. The server computer 402 may contain a logging utility 404 and a log retrieval service 414. The logging utility 404 may be configured to process log messages output by an application 424, script, service, or other computer program.

In one example, the logging utility 404 may include a log analysis module 406, a log template module 408, and a log data value module 410. The log analysis module 406 may be configured to analyze a log message generated by an application 424 and identify a log template for the log message. In one example configuration, the log analysis module 406 may be configured to query a template lookup table 432 for a template identifier associated with a log template identified in a log message. The template lookup table 432 may include template records that contain a log template and an associated template identifier.

A log template extraction tool 438 may be used to create the template lookup table 432, wherein application source code may be parsed to identify log statements included in the application source code and template identifiers may be generated for the log templates. The log templates and the corresponding template identifiers may be included in the template look up table 432.

The log analysis module 406 may be configured to analyze a log message to identify a log template using regular expression matching to identify the log template in the log message to a template record in the template lookup table 432 and retrieve a template identifier for the log template from the template record. After obtaining the template identifier for the log template, the log data value module 410 may be configured to store the template identifier and log data values included in the log message to a log data store 422. For example, a log message record may be created that includes the log data values and the template identifier and references the log template stored in the log templates data store 420.

In another example configuration, the log analysis module 406 may be configured to analyze a log message output by an application 424 at application execution time to identify template component(s) associated with a log template used in outputting the log message. As an illustration, the text of a log message may be parsed to identify template components included in the log message. The template components identified in the log message may then be used to generate a log template. The log template may include template value placeholders in which log data values can be inserted when placing the log message in a readable format.

The log template module 408 may be configured to generate or assign a template identifier to a log template obtained from a log message output by an application 424. For example, a template identifier may be generated using a log template or template components identified in a log message to produce a unique identifier. In one example, a hash function may be used to generate a template identifier. For example, a log template, or template components (e.g., a string of ordered template components) may be input into a hash function and a resulting hash value may be used as a template identifier. In another example, a unique value generator may be used to generate a unique value (e.g., numeric or alphanumeric) that may be used as a template identifier.

After generating or assigning a template identifier to a log template, in one example, a lookup may be performed for the template identifier in a template lookup table 432 stored (cached) in computer memory (memory modules 430) to determine whether the log template data store 420 contains a template record containing the log template. The template lookup table 432 may contain template identifiers for log templates that are stored in the log template data store 420. As such, performing a lookup for a template identifier in the template lookup table 432 may result in a faster determination of whether a particular log template exists in the log template data store 420 as compared to querying the log template data store 420 to determine whether the log template data store 420 contains the template identifier. In the case that the template lookup table 432 does not include the template identifier, the template identifier may be added to the template lookup table 432 and a template record containing the template log may be added to the log template data store 420 where the template record may be referenced by the template identifier.

In another example, after a template identifier has been generated or assigned to a log template, the log template data store 420 may be queried to determine whether the template identifier (and an associated template log) exists in the log template data store 420. In the case that the template identifier does not exist in the log template data store 420, a template record containing the template log may be created and stored to the log template data store 420, such that the template record may be referenced by the template identifier. As will be appreciated, other indexing methods may be used to store a log template to the log template data store 420 and determine whether a log template exists in the log template data store 420. These other indexing methods are within the scope of this disclosure.

In storing a template log to the log template data store 420, template components and template value placeholders that comprise the log template may be stored in a template record in the log template data store 420. As such, when reconstructing a log message, log data values can be placed in the template value placeholders. In one example, a key value data store (e.g., NoSQL data store) may be used to store log templates. A log template stored to the key value data store may be stored as a key/value (template identifier/log template) pair. In some examples, information about an application from which a log template was obtained may be included in a template record. For example, an application identifier (e.g., file name) and a source code line identifier (e.g., line number) may be included in the template record.

The log data value module 410 may be configured to store log data values included in a log message to a log data store 422. A template identifier associated with the log message may be stored with log data values in the log data store 422. The template identifier may be used to identify a log template in the log template data store 420 that is associated with the log data values. In one example, the log data value module 410 may be configured to create a log message record that includes log data values and a template identifier referencing a log template for a log message. The order of the log data values in the log message may determine the order of the log data values in the log message record. By maintaining the order of the log data values obtained from the log message, the log data values may be correctly placed in the log template associated with the log data values when reconstructing the log message.

The log retrieval service 414 may be configured to reconstruct a requested log message using log data values and a log template for the log message. In one example, the log retrieval service 414 may include a log retrieval module 416 and a log reconstruction module 418. The log retrieval module 416 may be configured to retrieve log data values and a template identifier from the log data store 422 and a log template associated with the log data values from the log template data store 420 in response to a request for a log message. For example, a request may be made to the log retrieval service 414 (via an API) to retrieve a log message from storage. In response to the request, a log message record associated with the log message may be identified and retrieved from the log data store 422. The log message record may contain log data values for the log message and a template identifier associated with a log template for the log message. After retrieving the log message record, the template identifier included in the log message record may be used to retrieve a log template referenced by the template identifier from the log template data store 420.

The log reconstruction module 418 may be configured to reconstruct a log message using a log template retrieved from the log template data store 420 and log data values retrieved from the log data store 422. For example, having retrieved a log template and log data values for a log message, the log retrieval module 416 may be configured to pass the log template and the log data values to the log reconstruction module 418. The log message may then be reconstructed by placing the log data values into the log template, and the reconstructed log message may be returned to a client 436. Illustratively, the log data values may be inserted into template value placeholders in the log template according to a positional order of the log data values as determined by the positional order of the template value placeholders in the log message record.

A customer may utilize a client 436 to request a computing instance and to control an executing computing instance. A client 436 may include any device capable of sending and receiving data over a network 434. A client 436 may comprise, for example a processor-based system such as a computing device. A client 436 may be a device such as, but not limited to, a desktop computer, laptop or notebook computer, tablet computer, mainframe computer system, handheld computer, workstation, network computer, or other devices with like capability.

API calls, procedure calls or other network commands that may be made in relation to the modules and services included in the server computer 402 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The various processes and/or other functionality contained within the system environment 400 may be executed on one or more processors 428 that are in communication with one or more memory modules 430. The system environment 400 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 434 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 4 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 4 illustrates an example of a system that may implement the techniques above, many other similar or different environments are possible. The example environments discussed and illustrated above are merely representative and not limiting.

Figure 5A:
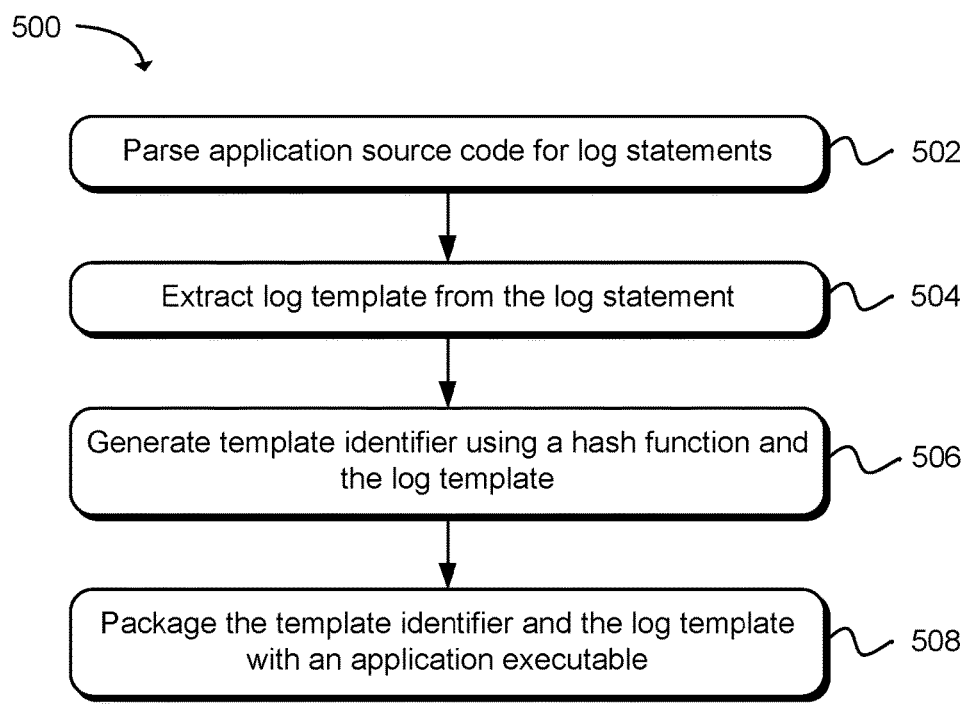
FIG. 5A is a flow diagram illustrating an example method for extracting log templates from application source code.

FIG. 5A is a flow diagram that illustrates an example method 500 for identifying log statements included in application source code and extracting log templates included in the log statements for packaging with an application executable. Starting in block 502, application source code may be parsed to identify log statements embedded in the application source code. In one example, the log template extraction tool described earlier may be used to parse the application source code.

A log template included in a log statement identified in the application source code may, as in block 504, be extracted from the log statement. For example, the log statement "system.out.printlog ("System error % restarting in % seconds")" includes the log template "System error % restarting in % seconds" which may be extracted from the log statement.

As in block 506, the log template extracted from the log statement may be used to generate a template identifier by inputting the log template to a hash function that outputs a hash value used as the template identifier. For example, the log template "System error % restarting in % seconds" may be input to a hash function (e.g., a Cyclic Redundancy Code hash function) that generates the hash value "cba766c8", which may be used as a template identifier for the log template. As in block 508, the log template and the template identifier may be packaged into an application executable for use by a logging utility, associated with the application executable, which identifies the log template in a log message output by the application and substitutes the log template with the template identifier and stores the template identifier with log data values included in the original log message.

Figure 5B:
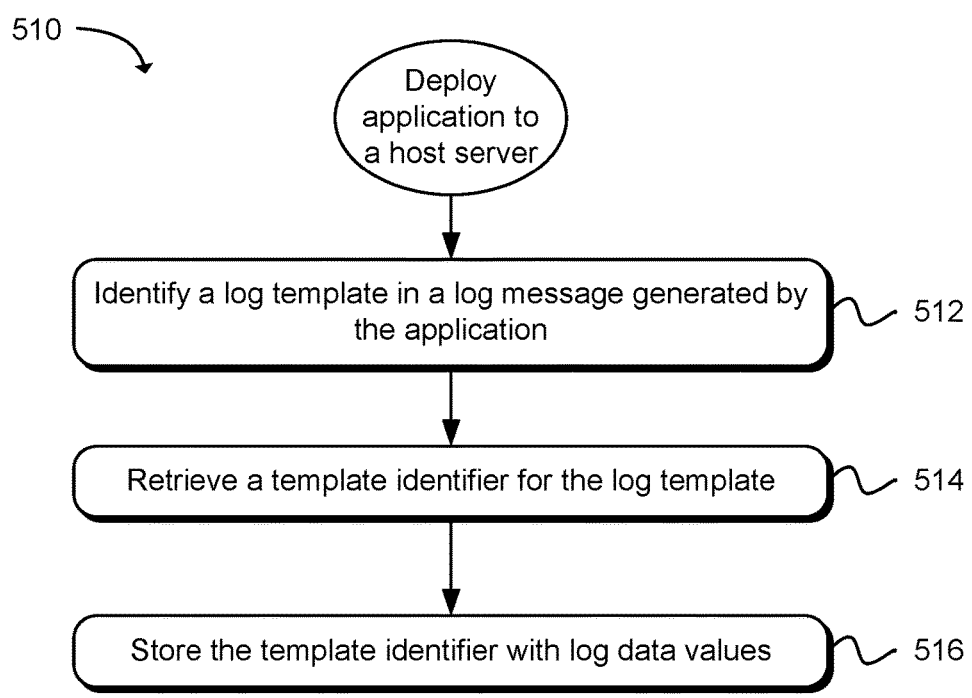
FIG. 5B is a flow diagram illustrating an example method for storing a log message.

FIG. 5B is a flow diagram that illustrates an example method 510 for processing a log message generated by an application deployed to a host server. Starting in block 512, a log template in a log message generated by the application may be identified. For example, regular expression matching may be used with the log template file packaged with the application executable to identify the log template in the log message. As in block 514, a template identifier for the log template may be retrieved. For example, the template identifier associated with the regular expression used to identify the log template may be obtained from the log template file included in the application executable.

As in block 516, the template identifier may be stored with log data values that may be included in the log message. For example, the log message "System error 500 restarting in 30 seconds" includes the log template "System error % restarting in % seconds" and the log data values "500 and 30". A logging utility may substitute the log template "System error % restarting in % seconds" with the template identifier "cba766c8" and a log message record containing the template identifier and the log data values (e.g., "cba766c8, 500, 30") may be stored to a log data store.

Figure 5C:
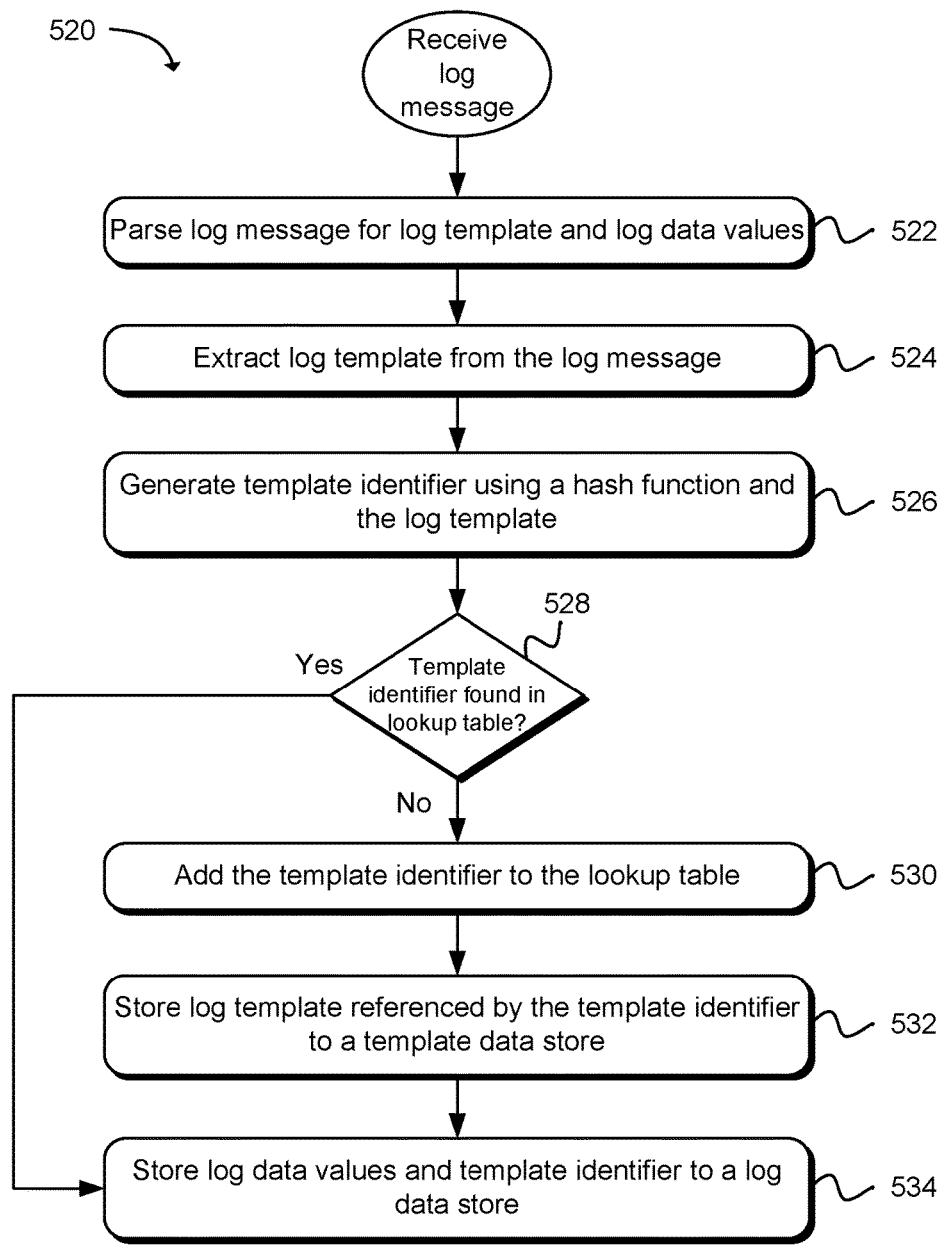
FIG. 5C is a flow diagram that illustrates an example method for processing a log message.

FIG. 5C is a flow diagram illustrating an alternative example method 520 for processing a log message to identify a log template and generate a template identifier at computer program execution time. Illustratively, the log message may be received from a computer program or computer system, or may be processed from a log message archive. Starting in block 522, the text of a log message may be parsed to identify a log template and log data values included in the log message. The log template may be a statement inserted into computer code that provides context for log data values output by a computer program.

After identifying the log template and the log message, as in block 524, the log template may be extracted from the log message. As in block 526, a template identifier may be generated using a hash function and the log template. For example, the log template may be input to the hash function and the resulting hash value may be used to uniquely identify the log template. As an illustration, the example log template "Error occurred launching the % service" may be input into a hash function (e.g., a Cyclic Redundancy Code hash function) that generates the hash value "47a32736", and the hash value may be used as a template identifier for the log template.

As in block 528, the template identifier may be used to determine whether the log template associated with the template identifier exists in a lookup table containing template identifiers for log templates that are stored in a template data store. In the case that the template identifier is not found in the lookup table, then as in block 530, the template identifier may be added to the lookup table and, as in block 532, the log template may be stored to the template data store where the log template may be referenced by the template identifier in the template data store. As in block 534, the log data values and the template identifier may be stored to a log data store where the template identifier may be used to identify and retrieve the log template from the template data store in the event that the log message is reconstructed using the log template and the log data values.

Figure 6:
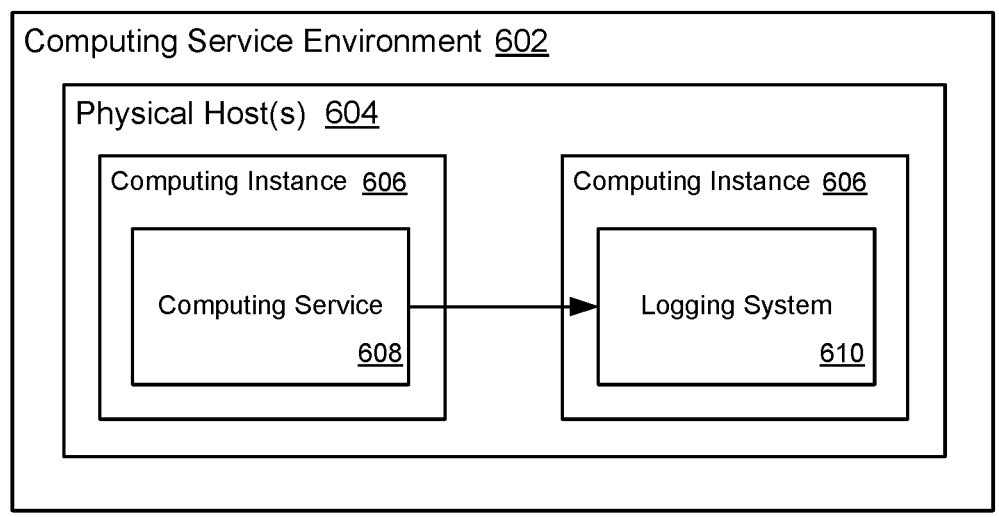
FIG. 6 is a block diagram illustrating an example computing service environment used to execute a logging system.

FIG. 6 is a diagram that illustrates an example computing service environment 602 that includes physical hosts 604 configured to host computing instances 606. The computing service environment 602 may employ virtualization that allows a single physical server computer to host multiple target computing service resources that may include computing instances (e.g., virtual guest machines) and other virtualization schemes (e.g., virtualized storage, virtualized networking, etc.).

A computing instance 606 may execute a logging system 610 that processes log messages output by a computing service 608 executing on the computing instance 606. In one example, the logging system 610 may analyze log messages output by the computing service 608 to identify a log template and log data values included in the log message and extract the log template and the log data values from the log message. The logging system 610 may then be configured to generate a template identifier the uniquely identifies the log template using a hash function or other method. The log template referenced by the template identifier may be stored in a template data store, and the log data values may be stored with the template identifier in a log data store. The template data store and/or the log data store may be located on the physical host 604 or located elsewhere in the computing service environment 602 (e.g., a data storage service).

Figure 7:
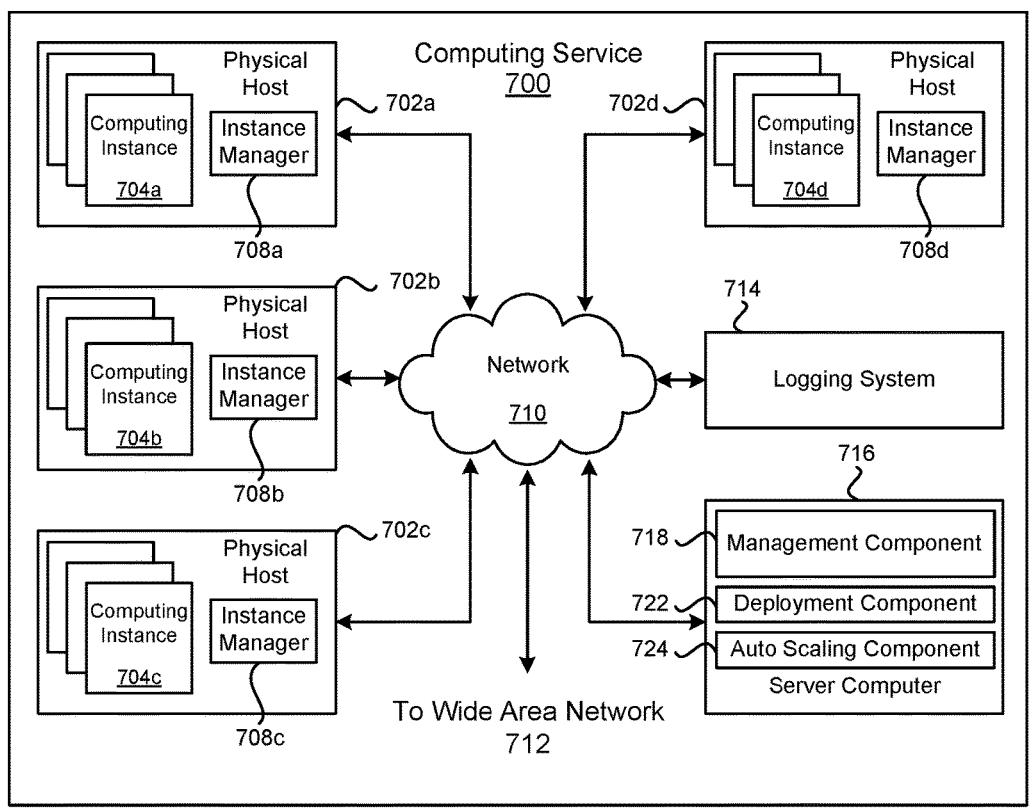
FIG. 7 is a block diagram that illustrates an example computing service environment that includes a logging system.

FIG. 7 is a block diagram illustrating an example computing service 700 that may be used to execute and manage a number of computing instances 704a-d. In particular, the computing service 700 depicted illustrates one environment in which the technology described herein may be used. The computing service 700 may be one type of environment that includes various virtualized service resources that may be used, for instance, to host computing instances 704a-d.

The computing service 700 may be capable of delivery of computing, storage and networking capacity as a software service to a community of end recipients. In one example, the computing service 700 may be established for an organization by or on behalf of the organization. That is, the computing service 700 may offer a "private cloud environment." In another example, the computing service 700 may support a multi-tenant environment, wherein a plurality of customers may operate independently (i.e., a public cloud environment). Generally speaking, the computing service 700 may provide the following models: Infrastructure as a Service ("IaaS"), Platform as a Service ("PaaS"), and/or Software as a Service ("SaaS"). Other models may be provided. For the IaaS model, the computing service 700 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 700. End customers may access the computing service 700 using networked client devices, such as desktop computers, laptops, tablets, smartphones, etc. running web browsers or other lightweight client applications, for example. Those familiar with the art will recognize that the computing service 700 may be described as a "cloud" environment.

The particularly illustrated computing service 700 may include a plurality of server computers 702a-d. While four server computers are shown, any number may be used, and large data centers may include thousands of server computers. The computing service 700 may provide computing resources for executing computing instances 704a-d. Computing instances 704a-d may, for example, be virtual machines. A virtual machine may be an instance of a software implementation of a machine (i.e. a computer) that executes applications like a physical machine. In the example of a virtual machine, each of the server computers 702a-d may be configured to execute an instance manager 708a-d capable of executing the instances. The instance manager 708a-d may be a hypervisor, virtual machine monitor (VMM), or another type of program configured to enable the execution of multiple computing instances 704a-d on a single server. Additionally, each of the computing instances 704a-d may be configured to execute one or more applications.

One or more server computers 714 and 716 may be reserved to execute software components for managing the operation of the computing service 700 and the computing instances 704a-d. For example, a server computer 714 may execute a logging system configured to process log messages output by resources executing within the computing service 700. The logging system may perform the functions described earlier, such as log message archival and log message reconstruction.

A server computer 716 may execute a management component 718. A customer may access the management component 718 to configure various aspects of the operation of the computing instances 704a-d purchased by a customer. For example, the customer may setup computing instances 704a-d and make changes to the configuration of the computing instances 704a-d.

A deployment component 722 may be used to assist customers in the deployment of computing instances 704a-d. The deployment component 722 may have access to account information associated with the computing instances 704a-d, such as the name of an owner of the account, credit card information, country of the owner, etc. The deployment component 722 may receive a configuration from a customer that includes data describing how computing instances 704a-d may be configured. For example, the configuration may include an operating system, provide one or more applications to be installed in computing instances 704a-d, provide scripts and/or other types of code to be executed for configuring computing instances 704a-d, provide cache logic specifying how an application cache should be prepared, and other types of information. The deployment component 722 may utilize the customer-provided configuration and cache logic to configure, prime, and launch computing instances 704a-d. The configuration, cache logic, and other information may be specified by a customer accessing the management component 718 or by providing this information directly to the deployment component 722.

Customer account information 724 may include any desired information associated with a customer of the multi-tenant environment. For example, the customer account information may include a unique identifier for a customer, a customer address, billing information, licensing information, customization parameters for launching instances, scheduling information, etc. As described above, the customer account information 724 may also include security information used in encryption of asynchronous responses to API requests. By "asynchronous" it is meant that the API response may be made at any time after the initial request and with a different network connection.

A network 710 may be utilized to interconnect the computing service 700 and the server computers 702a-d, 716. The network 710 may be a local area network (LAN) and may be connected to a Wide Area Network (WAN) 712 or the Internet, so that end customers may access the computing service 700. The network topology illustrated in FIG. 7 has been simplified, many more networks and networking devices may be utilized to interconnect the various computing systems disclosed herein.

Figure 8:
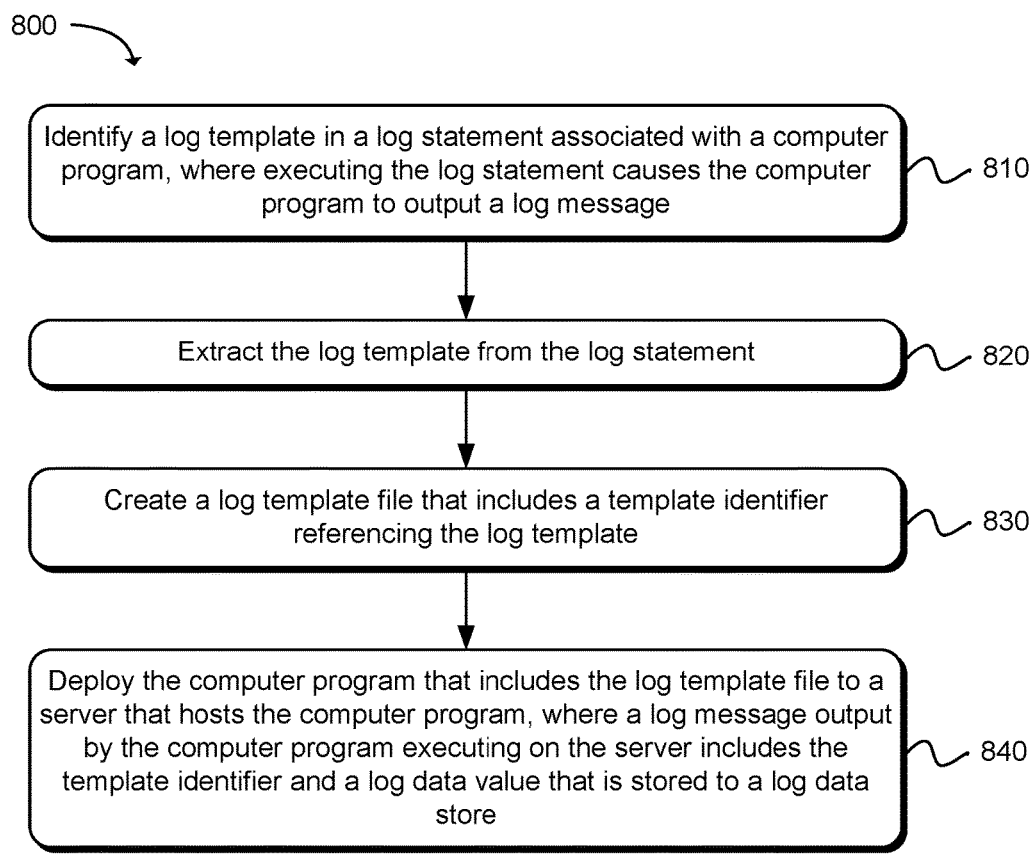
FIG. 8 is a flow diagram illustrating an example method for processing and storing a log message output by a computer program.

FIG. 8 is a flow diagram illustrating an example method 800 for processing and storing a log message generated by a log statement included in a computer program. Starting in block 810, a log template may be identified in a log statement associated with a computer program, where executing the log statement causes the computer program to output a log message.

As in block 820, the log template may be extracted from the log message and, as in block 830, a log template file may be created that includes the log template and a template identifier that references the log template. For example, the log template (e.g., a string value comprising the log template) may be used to generate the template identifier and the log template and the template identifier may be included in the log template file.

After creating the log template file, as in block 840, the log template file may be packaged with the computer program and the computer program may be deployed to a server that hosts the computer program, where a log message output by the computer program executing on the server may include the template identifier and a log data value that may be stored to a log data store.

Figure 9:
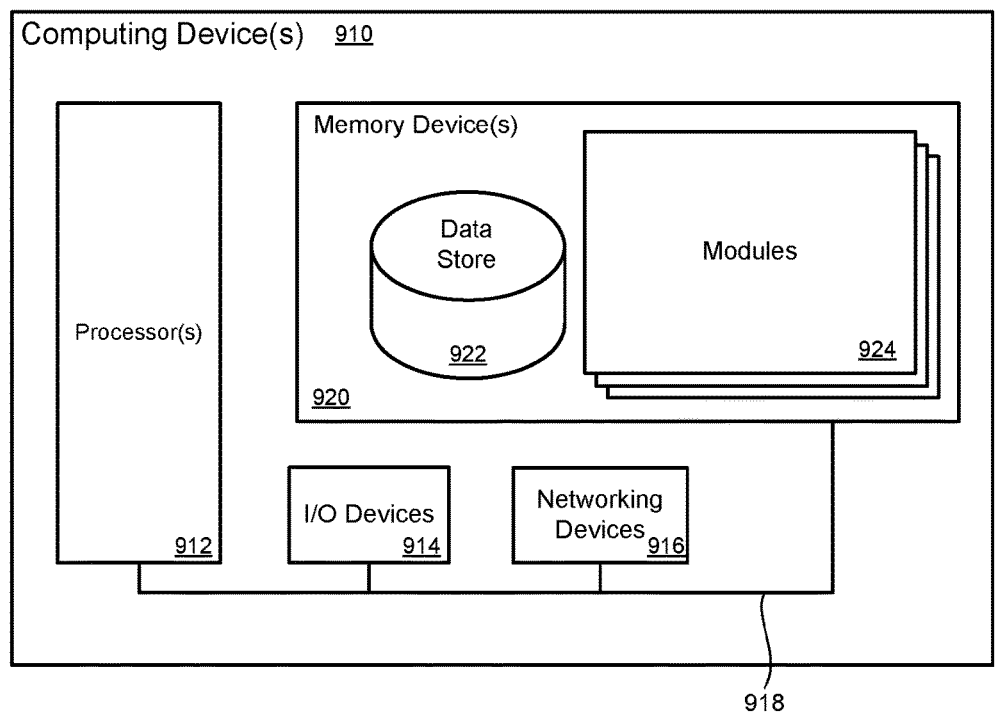
FIG. 9 is block diagram illustrating an example of a computing device that may be used to execute a method for processing log messages.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. In one example, the memory device 920 may include a log analysis module, a log template module, a template value placeholder module, a template identifier module, a log retrieval module, and a log reconstruction module. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, in the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method, comprising:
analyzing source code of an application to identify a log statement embedded in the source code, using a processor, wherein the log statement includes a log template and a template value placeholder, and executing the log statement generates a log message output by the application;
extracting the log template identified in the log statement, using the processor;
generating a template identifier using a hash function, using the processor;
storing a template record that contains the log template referenced by the template identifier in a log template data store, using the processor;
creating a log template file that includes the log template and the template identifier; and
deploying an application package that includes the log template file to a server that hosts the application, using the processor, wherein the template identifier in the log template file replaces the log template in a log message output by the application, and the log message containing the template identifier and a log data value for the template value placeholder is stored to a log data store.

2. A method as in claim 1, further comprising querying the log template data store with the template identifier to determine whether the template record exists in the log template data store.

3. A method as in claim 1, further comprising:
retrieving the log data value and the template identifier from the log data store in response to a request for the log message;
retrieving the template record from the log template data store using the template identifier; and
reconstructing the log message from the log template and the log data value.

4. A computer implemented method, comprising:
identifying a log template in a log statement associated with a computer program, using a processor, wherein executing the log statement causes the computer program to output a log message;
extracting the log template from the log statement, using the processor;
creating a log template file that includes a template identifier referencing the log template, using the processor; and
deploying the computer program with the log template file to a server that hosts the computer program, using the processor, wherein outputting a log message during execution of the computer program on the server replaces the log template with the template identifier obtained from the log template file, and the log message is stored to a log data store.

5. A method as in claim 4, further comprising parsing text of the log statement to identify template components of the log template.

6. A method as in claim 4, further comprising generating the template identifier for the log template using template components extracted from the log statement to produce a unique identifier.

7. A method as in claim 4, further comprising inputting a string of ordered template components comprising the log template to a hash function to generate the template identifier.

8. A method as in claim 4, further comprising:
querying a log template data store for the template identifier to determine that the log template data store does not contain the log template; and
storing a template record that contains the log template and is referenced by the template identifier in the log template data store.

9. A method as in claim 8, wherein storing the log template referenced by the template identifier in the log template data store further comprises storing the log template in a key value NoSQL data store where the template identifier and the log template are stored as a key value pair.

10. A method as in claim 4, further comprising performing a lookup for the template identifier in a template lookup table stored in computer memory to determine that a log template data store does not contain the log template.

11. A method as in claim 4, further comprising storing ordered template components and template value placeholders that comprise the log template in a log template data store.

12. A method as in claim 4, further comprising:
receiving a request to retrieve the log message from storage;
retrieving the log data value from the log data store;
retrieving the log template from a log template data store; and
reconstructing the log message.

13. A method as in claim 12, further comprising obtaining the template identifier from the log data store, wherein the template identifier is used to retrieve the log template from a log template data store.

14. A method as in claim 12, wherein reconstructing the log message further comprises reconstructing the log message using the log template and a log data value that is inserted into the log template.

15. A method as in claim 4, further comprising receiving log output from the computer program at a logging service that processes the log output.

16. A method as in claim 4, wherein the computer program that outputs the log message is a computing service that executes within a computing service environment.

17. A method as in claim 4, further comprising receiving the log message at a log archival service that executes within a computing service environment.

18. A system comprising:
at least one processor;
a memory device including instructions that, when executed by the at least one processor, cause the system to:
receive a log message output by a computing service executing in a computing service environment;
analyze the log message to identify a log template and log data value;
extract the log template from the log message;
extract the log data value from the log message;
generate a template identifier using a hash function that uniquely identifies the log template;
store the log template as referenced by the template identifier in a log template data store; and
store the log data value with the template identifier in a log data store, wherein the log template and the log data value included in the log message are stored separately.

19. A system as in claim 18, wherein the memory device includes instructions that, when executed by the processor, causes the system to receive the log message at a logging service that provides log message archival to computing services executing within the computing service environment.

20. A system as in claim 18, wherein the memory device includes instructions that, when executed by the processor, causes the system to receive a request for the log message at a logging system that retrieves the log template and the log data value and reconstructs the log message in response to the request for the log message.

* * * * *